Feb. 6, 1923.

F. W. NORTHRUP.
DEVICE FOR EXCLUDING FOREIGN MATTER FROM THE INSIDE OF WHEEL HUBS.
FILED AUG. 3, 1921.

1,444,700.

Inventor
Fred W. Northrup

By
Heaver Kelly, Attorney

Patented Feb. 6, 1923.

1,444,700

UNITED STATES PATENT OFFICE.

FRED W. NORTHRUP, OF SPEEDSVILLE, NEW YORK.

DEVICE FOR EXCLUDING FOREIGN MATTER FROM THE INSIDE OF WHEEL HUBS.

Application filed August 3, 1921. Serial No. 489,527.

*To all whom it may concern:*

Be it known that I, FRED W. NORTHRUP, a citizen of the United States, residing at Speedsville, in the county of Tompkins and State of New York, have invented certain new and useful Improvements in a Device for Excluding Foreign Matter from the Inside of Wheel Hubs, of which the following is a specification.

The present invention relates to a device for projection over the hub of a wheel from a part of a vehicle adjacent the wheel for the purpose of excluding dirt, grit and moisture from the inside of the hub of the wheel.

The further object of the invention is to provide an improved device of the above character which is adapted for use in connection with conventional types of vehicles and wheels and which may be quickly and easily attached to or detached from the vehicle or wheel.

Various other objects and advantages of my invention will become apparent during the continuance of the following description.

In the drawings:—

Figure 1:
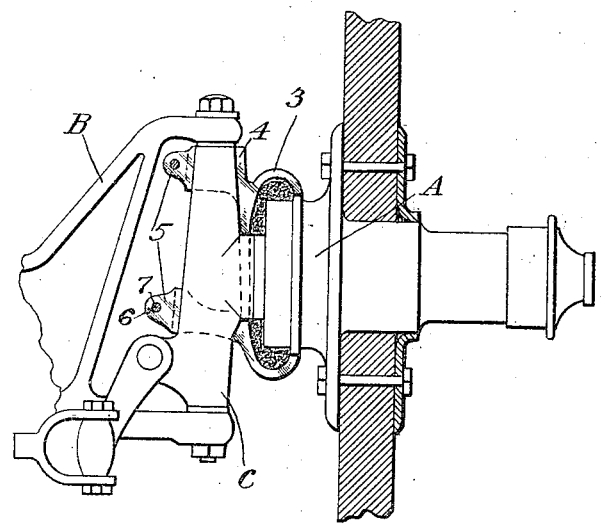
Fig. 1 represents the device of my invention in vertical cross-section as applied to a conventional form of automobile wheel and the adjacent steering knuckle.

In the drawings A represents a wheel hub of conventional type while B represents an axle whose forked end carries a conventional steering knuckle C. In connection with this construction I have shown a device of my invention but it is to be fully understood that my invention is readily adaptable to other constructions and to various types of hubs and steering knuckles.

The device of my invention consists preferably of two complemental sections 1 and 2 that may be constructed of cast material and suitably connected as will be hereinafter described. The main or body portion of the sections 1 and 2 are preferably semicircular when viewed in front elevation and also semicircular when viewed in cross section. This construction provides, when the sections are secured together, a substantially circular device having an interior circular channel which may accommodate packing material as indicated at 3.

Figure 2:
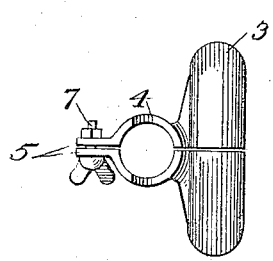
Fig. 2 represents my invention as viewed in top plan.
Figure 3:
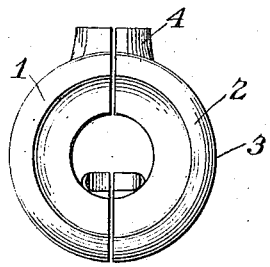
Fig. 3 is a view of my invention in front elevation.
Figure 4:
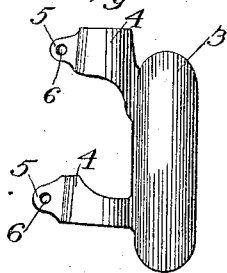
Fig. 4 is a view of my invention in side elevation.

Each section is provided with substantially vertically aligned brackets 4, which may be cast integral with the respective section. The brackets 4 are in turn provided with ears 5 which have openings 6, the openings of the respective upper and lower brackets of the two sections being adapted to register when the sections 1 and 2 and the brackets 4 are arranged in connection with the hub A and the steering knuckle C as shown in Fig. 1. When the ears of the respective upper and lower brackets are properly aligned as shown in Fig. 2, means such as shown at 7 may be employed to connect the ears and thereby retain the sections 1 and 2 in rigid relation to each other.

In actual practice sections 1 and 2 are fitted about the hub A as shown in Fig. 1, suitable packing material being first positioned in the channel portion of the sections so that it will fit snugly about the hub A and axle portion which passes therethrough. When the sections 1 and 2 are thus positioned, the brackets 4 fit the steering knuckle C thereby bringing the ears of the respective upper and lower brackets into alignment. Suitable means may now be employed to fasten the opposite ears together such as shown in Fig. 2 thereby retaining the sections in rigid relation to each other and stationary with respect to the hub A.

From the above it will be seen that my invention, being simple in construction and consisting of but few parts, can be quickly and easily attached to or detached from the steering knuckle C and that when it is in position it will exclude foreign matter from working between the hub A and the axle which passes therethrough.

Having thus fully described my invention what is claimed as new and desire to be secured by Letters Patent is:—

1. A device for excluding foreign matter from the inside of wheel hubs comprising two complemental semi-circular sections adapted to be secured together about one end of the hub and providing, when secured, a substantially circular enclosure having an interior circular channel to accommodate packing material.

2. A device for excluding foreign matter from the inside of wheel hubs comprising two complemental sections adapted to be fitted about the hub and providing a substantially circular inclosure having an interior circular channel to accommodate packing material, and bracket means on each section, the said bracket means of the two sections being adapted to meet for clamping the sections to a support.

3. A device for excluding foreign matter from the inside of wheel hubs comprising a circular casing adapted to enclose the inner end of the hub adjacent the steering knuckle and having an interior circular channel to accommodate packing material, supporting brackets carried by the casing for embracing the steering knuckle, and means for clamping the brackets to the steering knuckle.

In testimony whereof I affix my signature.

FRED W. NORTHRUP.